United States Patent
Inagaki et al.

(10) Patent No.: US 7,979,982 B2
(45) Date of Patent: Jul. 19, 2011

(54) IMAGING DEVICE, AND METHOD FOR MANUFACTURING THE SAME

(75) Inventors: Tatsuhiko Inagaki, Kanagawa (JP);
Makoto Imai, Kanagawa (JP);
Hldetoshi Mimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/681,825

(22) PCT Filed: Feb. 5, 2009

(86) PCT No.: PCT/JP2009/000440
§ 371 (c)(1),
(2), (4) Date: Apr. 6, 2010

(87) PCT Pub. No.: WO2009/101774
PCT Pub. Date: Aug. 20, 2009

(65) Prior Publication Data
US 2010/0236063 A1    Sep. 23, 2010

(30) Foreign Application Priority Data

Feb. 13, 2008  (JP) ................................ 2008-032033

(51) Int. Cl.
*H05K 3/30* (2006.01)
(52) U.S. Cl. ....................................................... 29/832
(58) Field of Classification Search ............ 29/825–837;
348/207.1–376
See application file for complete search history.

(56) References Cited

U.S. PATENT DOCUMENTS

| 4,866,837 | A | * | 9/1989 | Heissenberger et al. | ........ 29/741 |
| 5,044,072 | A | * | 9/1991 | Blais et al. | ....................... 29/834 |
| 5,152,055 | A | * | 10/1992 | L'Esperance et al. | .......... 29/834 |
| 5,194,948 | A | * | 3/1993 | L'Esperance et al. | .......... 348/87 |
| 5,680,698 | A | * | 10/1997 | Armington et al. | ............. 29/833 |
| 6,117,193 | A | * | 9/2000 | Glenn | ........................... 29/25.01 |
| 6,317,972 | B1 | * | 11/2001 | Asai et al. | ....................... 29/833 |

(Continued)

FOREIGN PATENT DOCUMENTS

JP    2002-247442 A    8/2002

(Continued)

OTHER PUBLICATIONS

International Search Report for PCT/JP2009/000440 dated Apr. 21, 2009.

*Primary Examiner* — Derris H Banks
*Assistant Examiner* — Kaying Kue
(74) *Attorney, Agent, or Firm* — Pearne & Gordon LLP

(57) ABSTRACT

A vehicle-mounted camera (1) comprises a lower case (2) constituting a part of a case, an upper case (3) provided with lenses (3a, 3b) constituting the case integrally with the lower case (2), an imaging element (4) for converting light passing through the lenses (3a, 3b) into an electrical signal, an MID-mounting substrate (6) with the imaging element (4) mounted, substrate mounting bosses (3c, 3d) for mounting the MID-mounting substrate (6) to the upper case (3), and spacers (7a, 7b) interposed between the MID-mounting substrate (6) and the substrate mounting bosses (3c, 3d) for adjusting the clearance between the lenses (3a, 3b) and the light receiving plane of the imaging element (4), structured to fix the lower case (2) to the upper case (3) while the MID-mounting substrate (6) mounted with the imaging element (4) is being fixed to the upper case (3) by the substrate mounting bosses (3c, 3d).

2 Claims, 5 Drawing Sheets

U.S. PATENT DOCUMENTS

| | | | |
|---|---|---|---|
| 6,718,626 B2 * | 4/2004 | Kawada | 29/740 |
| 6,762,790 B1 * | 7/2004 | Matko et al. | 348/148 |
| 6,956,615 B2 * | 10/2005 | Nakagishi et al. | 348/374 |
| 7,059,040 B1 * | 6/2006 | Webster et al. | 29/831 |
| 7,110,033 B2 * | 9/2006 | Miyake | 348/340 |
| 7,168,161 B2 * | 1/2007 | Hanada et al. | 29/841 |
| 7,299,545 B2 * | 11/2007 | Yamauchi et al. | 29/833 |
| 7,367,724 B2 * | 5/2008 | Matsushita et al. | 396/529 |
| 7,433,038 B2 * | 10/2008 | Bijnen et al. | 356/400 |
| 7,527,385 B2 * | 5/2009 | Lin | 353/101 |
| 7,576,930 B2 * | 8/2009 | Yu | 359/821 |
| 7,587,803 B2 * | 9/2009 | Montfort et al. | 29/407.1 |
| 7,630,016 B2 * | 12/2009 | Nagano | 348/374 |
| 7,646,075 B2 * | 1/2010 | Akram | 257/434 |
| 7,707,712 B2 * | 5/2010 | Kim | 29/832 |
| 7,707,713 B2 * | 5/2010 | Akagawa et al. | 29/833 |
| 7,746,578 B2 * | 6/2010 | Sakai et al. | 359/811 |
| 7,787,193 B2 * | 8/2010 | Sakamoto et al. | 359/696 |
| 7,787,761 B2 * | 8/2010 | De Lajarte | 396/241 |
| 2002/0056188 A1 * | 5/2002 | Yamaguchi | 29/743 |
| 2002/0140836 A1 * | 10/2002 | Miyake et al. | 348/340 |
| 2002/0140837 A1 * | 10/2002 | Miyake et al. | 348/340 |
| 2005/0125993 A1 * | 6/2005 | Madsen et al. | 29/739 |
| 2006/0126195 A1 * | 6/2006 | Rau et al. | 359/819 |
| 2007/0097526 A1 * | 5/2007 | Chiang | 359/819 |
| 2008/0192435 A1 * | 8/2008 | Yamamiya | 361/703 |
| 2009/0002852 A1 * | 1/2009 | Wang | 359/819 |
| 2009/0128684 A1 * | 5/2009 | Apel | 348/360 |
| 2010/0236063 A1 * | 9/2010 | Inagaki et al. | 29/832 |
| 2010/0259655 A1 * | 10/2010 | Takayama | 348/262 |

FOREIGN PATENT DOCUMENTS

JP    2007-4068 A    1/2007

* cited by examiner (a)

(b)

(c)

PRIOR ART

IMAGING DEVICE, AND METHOD FOR MANUFACTURING THE SAME

BACKGROUND

1. Technical Field

The present invention relates to an imaging device and a method for manufacturing the same.

2. Related Art

In recent years, imaging devices have been widely used, for example, in vehicles and mobile phones, and are required to be miniaturized as they become popular. As one way to achieve miniaturization of imaging devices, there is known an imaging device having an imaging element compactly mounted on a circuit board utilizing molded interconnect device (MID) method.

An imaging device of this type known in related art is disclosed in JP-2007-102017, for example, which prevents electrical problems attributed to the condition of the joints between an MID and a circuit board being incomplete when mounting a relatively heavy lens such as a high performance wide-angle lens.

As shown in FIG. 5, an imaging device 10 disclosed in JP-2007-102017 is provided with a lens 11 having a male thread section 11a, a lens bracket 12 having the lens 11 mounted therein, a lens fixing nut 13, an imaging element 14 for converting the light passing through the lens 11 to an electrical signal, an MID 15 having the imaging element 14 mounted thereon, an MID mounting substrate 16 having the MID 15 mounted thereon, a plate spring 21 attached to the lens bracket 12, a lower case 22 constituting a part of a housing, and an upper case 23 engaged with the plate spring 21 that presses down the lens bracket 12 towards the lower case 22 as the upper case 23 is fixed to the lower case 22.

In the lens bracket 12, there are formed a female thread section 12a for accepting the lens 11, a guide groove 12b for positioning the MID 15 in a direction orthogonal to an optical axis of the lens 11 with respect to the lens bracket 12 as shown by an arrow 11A in the drawing when engaged with the MID 15, an engaging section 12c that engages with the MID mounting substrate 16, and a catch 12d for securing the plate spring 21 in place. Meanwhile, in the upper case 23, there is formed an engaging section 23a that engages with the plate spring 21 as the upper case 23 is fixed to the lower case 22. Accordingly, when the upper case 23 is fixed to the lower case 22, the MID mounting substrate 16 is pressed by the lens bracket 12 and is fixed to the lower case 22 as the section 23a of the upper case 23 engages with the plate spring 21.

The imaging device 10 in related art thus described is assembled in the following manufacturing process.

First, the lens 11 attached with the lens fixing nut 13 is inserted to the lens bracket 12. In this case, by engaging the male thread section 11a of the lens 11 with the female thread section 12a of the lens bracket 12, the lens 11 attached with the fixing nut 13 and the lens bracket 12 become unified.

Next, the imaging element 14, the MID 15, and the MID mounting substrate 16 are fixed to one another to be unified.

The plate spring 21 is then secured to the lens bracket 12 by latching the plate spring 21 to the catch 12d of the lens bracket 12.

Thereafter, the lens bracket 12 is fitted with the MID 15 along the guide groove 12b, and is engaged with the MID mounting substrate 16 at the engaging section 12c of the lens bracket 12, determining the position of the MID 15 with respect to the lens bracket 12 in the direction orthogonal to the optical axis of the lens 11.

By adjusting an engaged position of the lens 11 with respect to the lens bracket 12, the position of the lens 11 with respect to the imaging element 14 in the optical axis direction, i.e., focus position, is adjusted. After the focus is adjusted with respect to the imaging element 14, the lens 11 is secured to the lens bracket 12 with the lens fixing nut 13.

The imaging element 14, the MID 15, and the MID mounting substrate 16 fixed to the lens bracket 12 that is with the lens 11 fixed therein are then inserted to the lower case 22 as an internal component 20.

When the upper case 23 is fixed to the lower case 22 while the internal component 20 is being inserted therein, the engaging section 21a of the plate spring 21 fixed to the lens bracket 12 is pressed by the engaging section 23a of the upper case 23, and thus the internal component 20 is fixed inside the upper case 23 and the lower case 22.

In the imaging device 10 in related art structured as above, when it is applied, for example, to a vehicle-mounted camera whose mounting position is predetermined with respect to an automotive vehicle, the internal component 20 needs to be adjusted to an optimal position with respect to the lower case 22 and the upper case 23 during the manufacturing process of the imaging device 10.

SUMMARY OF THE INVENTION

In the imaging device 10 in related art, since the position of the internal component 20 is determined by the lower case 22 and the upper case 23, there have been problems in that not only the position of the internal component 20 with respect to the lower case 22 and the upper case 23 is difficult to adjust in the manufacturing process, but also the optical axis of the lens 11 may become misaligned with respect to the photographing subject as the position of the internal component 20 with respect to the lower case 22 and the upper case 23 is likely to be displaced by vibrations after its completion.

In addition, in the imaging device 10 in related art, since the lens 11 is fixed to the lens bracket 12 by way of the lower case 22 and the upper case 23, there has been a problem in that the number of constituent components tends to increase, thereby complicating the manufacturing process.

In view of the problems described above, it is an object of the present invention to provide an imaging device and a manufacturing method thereof that can simplify the manufacturing process facilitating its production, and prevent misalignment of optical axis of the lens thereof due to vibrations or the like.

An imaging device according to the present invention includes a first case constituting a part of a case, a second case provided with a lens and constituting the case integrally with the first case, an imaging element for converting light passing through the lens into an electrical signal, a circuit board with the imaging element mounted thereon, mounting means for mounting the circuit board onto the second case, and an adjustment member provided between the circuit board and the mounting means for adjusting a clearance between the lens and a light receiving plane of the imaging element, in which the first case is fixed to the second case while the circuit board mounted with the imaging element is being secured to the second case via the mounting means.

With this configuration, in the imaging device according to the present invention, since the first case is fixed to the second case while the circuit board mounted with the imaging element is being secured to the second case via the mounting means, the optical axis of the lens can be prevented from being misaligned due to, for example, vibrations or the like.

Further, with this configuration, in the imaging device according to the present invention, since the first case is fixed to the second case while the circuit board mounted with the imaging element is being secured to the second case provided with the lens via the mounting means, the manufacturing process can be simplified. Furthermore, since the clearance between the lens and the light receiving plane of the imaging element can be adjusted by the adjustment member, the focus adjustment for the imaging device can also be simplified. Consequently, the imaging device according to the present invention can be easily manufactured.

Further, the imaging device according to the present invention has a structure of the mounting means being integrally formed with the second case.

With this configuration, in the imaging device according to the present invention, since the mounting means is integrally formed with the second case, the circuit board mounted with the imaging element can be directly secured to the second case, and the optical axis of the lens can be prevented from being misaligned due to, for example, vibrations or the like.

Furthermore, with this configuration, in the imaging device according to the present invention, since the mounting means is integrally formed with the second case, the manufacturing process can be simplified, thereby facilitating its production.

A method for manufacturing an imaging device according to the present invention includes preparing a first case constituting a part of a case, a second case provided with a lens and constituting the case integrally with the first case, an imaging element for converting light passing through the lens into an electrical signal, a circuit board with the imaging element mounted thereon, mounting means for mounting the circuit board onto the second case, and an adjustment member provided between the circuit board and the mounting means for adjusting a clearance between the lens and a light receiving plane of the imaging element; mounting the circuit board onto the second case via the mounting means; and fixing the first case onto the second case, in which the mounting of the circuit board includes adjusting a clearance between the lens and the light receiving plane of the imaging element with the adjustment member when mounting the circuit board onto the second case via the mounting means.

With this configuration, in the method for manufacturing an imaging device according to the present invention, since the first case is fixed to the second case while the circuit board mounted with the imaging element is being secured to the second case via the mounting means, the imaging device can be manufactured that can prevent an optical axis of the lens from being misaligned due to vibrations or the like.

Further, with this configuration, in the method for manufacturing an imaging device according to the present invention, since the focus position is adjusted by the adjustment member when mounting the circuit board to the second case via the mounting means, the focus position can be adjusted by a simple step of merely placing the adjustment member, thereby facilitating the production of the imaging device.

EFFECTS OF THE INVENTION

The present invention can provide an imaging device and a method for manufacturing the same which can simplify the manufacturing process facilitating its production and prevent the optical axis of the lens from being misaligned due to vibrations or the like.

DESCRIPTION OF REFERENCE NUMERALS

1: Vehicle-mounted Camera (Imaging device)
2: Lower Case (First Case)
3: Upper Case (Second Case)
3a, 3b: Lens
3c, 3d: Substrate Mounting Boss (Mounting Means)
4: Imaging Element
5: MID
6: MID Mounting Substrate (Circuit Board)
7a, 7b: Spacer (Adjustment Member)
8a, 8b: Fixing Screw (Mounting Means)

DETAILED DESCRIPTION OF THE INVENTION

Now, with reference to accompanied drawings, an embodiment of the present invention will be described below.

Figure 1:
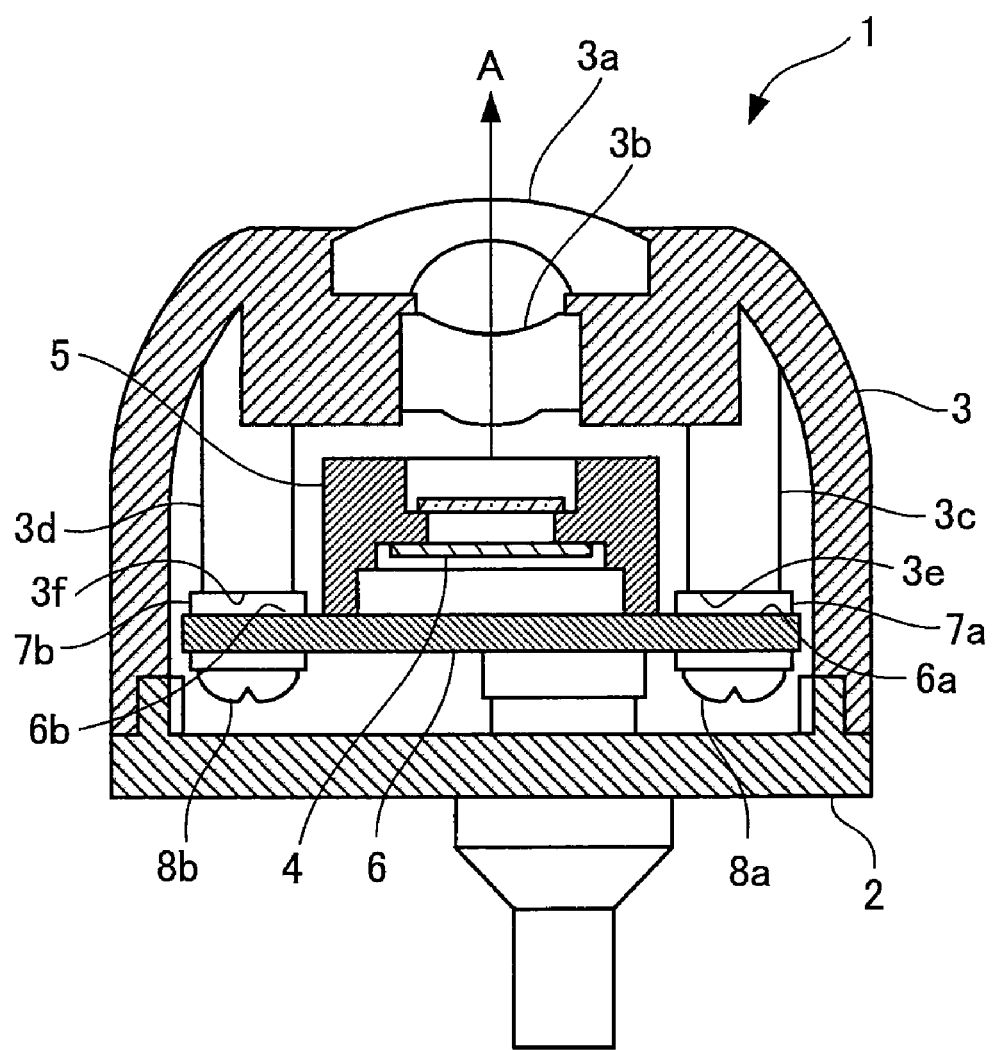
FIG. 1 is a cross-sectional view of a vehicle-mounted camera in accordance with an embodiment of the present invention.

FIG. 1 is a cross-sectional view of a vehicle-mounted camera 1 in accordance with the embodiment.

The structure of the vehicle-mounted camera 1 will be described first.

As shown in FIG. 1, the vehicle-mounted camera 1 according to the present embodiment includes a lower case 2 constituting a part of a body case, an upper case 3 provided with lenses 3a and 3b and constituting the body case integrally with the lower case 2, an imaging element 4, an MID 5 with the imaging element 4 mounted thereon, an MID mounting substrate 6 with the MID 5 mounted thereon, two pieces of substrate mounting bosses 3c and 3d protruding from within the upper case 3 towards the MID mounting substrate 6, spacers 7a and 7b provided between the substrate mounting bosses 3c and 3d and the MID mounting substrate 6, and fixing screws 8a and 8b for securing the MID mounting substrate 6 to the substrate mounting bosses 3c and 3d.

The lower case 2 and the upper case 3 are composed of resin or the like and constitute the body case of the vehicle-mounted camera 1 when fixed with each other. The lower case 2 and the upper case 3 constitute the first case and the second case of the present invention, respectively.

As for the method of fixing the lower case 2 and the upper case 3 together, a method using an ultrasonic welding can be used, for example. In this method, since the resin or the like of the joint surfaces of the lower case 2 and the upper case 3 is completely fused, the body case of the vehicle-mounted camera 1 becomes highly air-tight, thereby making the vehicle-mounted camera 1 splash-proof.

Further, in the upper case 3, two pieces of the substrate mounting bosses 3c and 3d having respective end faces 3e and 3f and protruding from desired positions inside the upper case 3 are integrally formed. The number of substrate mounting bosses 3c and 3d are not limited to two, and three, four, or more of them may be used. Furthermore, the substrate mounting bosses 3c and 3d may be separate components not integrally formed with the upper case 3.

The substrate mounting bosses 3c and 3d are adapted to secure the MID mounting substrate 6. The details of the substrate mounting bosses 3c and 3d will be described later.

The lenses 3a and 3b are fixed being embedded in the upper case 3 and composed of glass or resin such as plastic, and are adapted to focus the light from the subject to form an image onto the imaging element 4. Since the lenses 3a and 3b are unified with the upper case 3, not as in the case of the vehicle-mounted camera in the related art in which the lenses and the upper case are separate, it is not necessary to provide any packing materials or the like to the joint portion of the lenses and the upper case, thereby simplifying the structure of the upper case 3.

The imaging element 4 is mounted onto the MID 5 and is adapted to convert the light passing through the lenses 3a and 3b to an electrical signal.

The MID 5 is adapted to mount the imaging element 4 as a three-dimensional circuit forming member and to be fixed onto the MID mounting substrate 6 and inserted between the substrate mounting bosses 3c and 3d with a predetermined clearance. More specifically, the MID 5 is fixed onto the MID mounting substrate 6 so that the position of a light receiving plane of the imaging element 4 comes to a desired position with respect to an optical axis of the lenses 3a and 3b.

The MID mounting substrate 6 has mounting faces 6a and 6b with respective through-holes formed therein for passing through the fixing screws 8a and 8b, and is secured to the substrate mounting bosses 3c and 3d via the screws 8a and 8b through these holes. The MID mounting substrate 6 constitutes the circuit board of the invention.

The spacers 7a and 7b are provided between the substrate mounting bosses 3c and 3d and the MID mounting substrate 6, and serve as adjustment members having a predetermined thickness for adjusting distances between the end faces 3e and 3f of the substrate mounting bosses 3c and 3d and the mounting faces 6a and 6b of the MID mounting substrate 6.

The end faces 3e and 3f of the above-described substrate mounting bosses 3c and 3d are in parallel with a direction orthogonal to the optical axis of the lenses 3a and 3b, and have respective screw holes formed therein. By tightening the fixing screws 8a and 8b to the screw holes of the end faces 3e and 3f, the MID mounting substrate 6 is fixed in a position parallel to the imaging element 4 and positioned in the direction orthogonal to the optical axis of the lenses 3a and 3b. Consequently, the position of the light receiving plane of the imaging element 4 is secured with respect to the optical axis of the lenses 3a and 3b. The substrate mounting bosses 3c and 3d and the fixing screws 8a and 8b constitute the mounting means of the present invention. Further, according to the present embodiment, the respective surfaces of the end faces 3e and 3f of the substrate mounting bosses 3c and 3d are not limited to be in parallel with the direction orthogonal to the optical axis of the lenses 3a and 3b.

Now, in order for a clear image of a subject to be taken by the vehicle-mounted camera 1, it is necessary to detect an optimal focus position of the lenses 3a and 3b with respect to the imaging element 4.

Such an optimal focus position is detected in the following manner.

A focus adjustment chart, for example, is photographed as a photographing subject by the imaging element 4 through the lenses 3a and 3b, and the optimal focus position is detected based on the resolution of the focus adjustment chart photographed.

Figure 2:
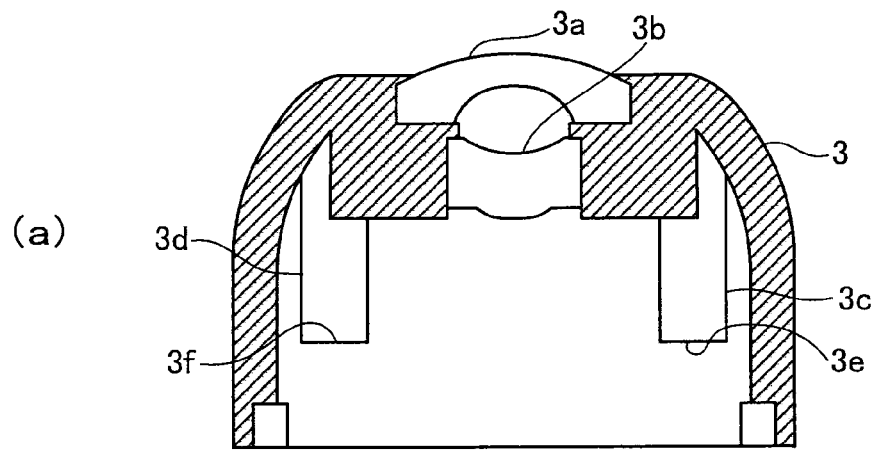
FIG. 2 is cross-sectional views of the vehicle-mounted camera illustrating a part of its assembling process in accordance with the embodiment, FIG. 2A being a cross-sectional view showing an upper case of the vehicle-mounted camera, FIG. 2B being a cross-sectional view showing an MID mounting substrate abutting to substrate mounting bosses of the upper case, and FIG. 2C being a cross-sectional view showing the MID mounting substrate being moved in a direction shown by an arrow B.
Figure 2:
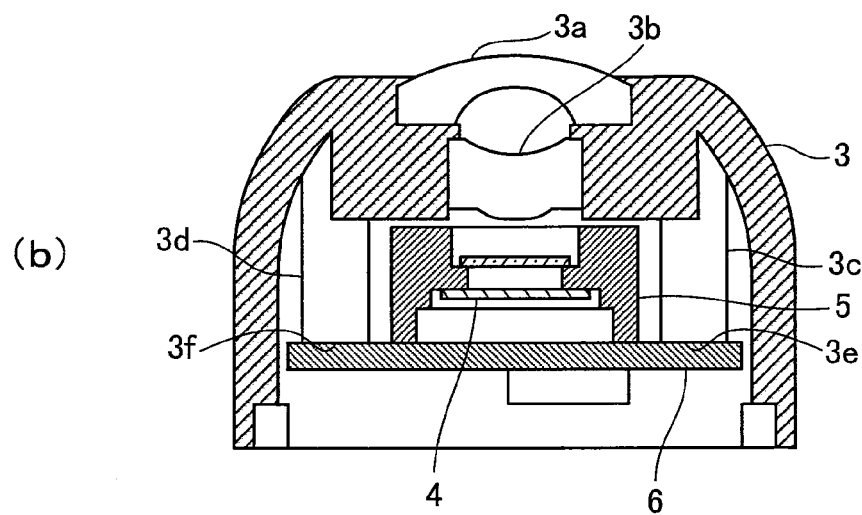
Figure 2:
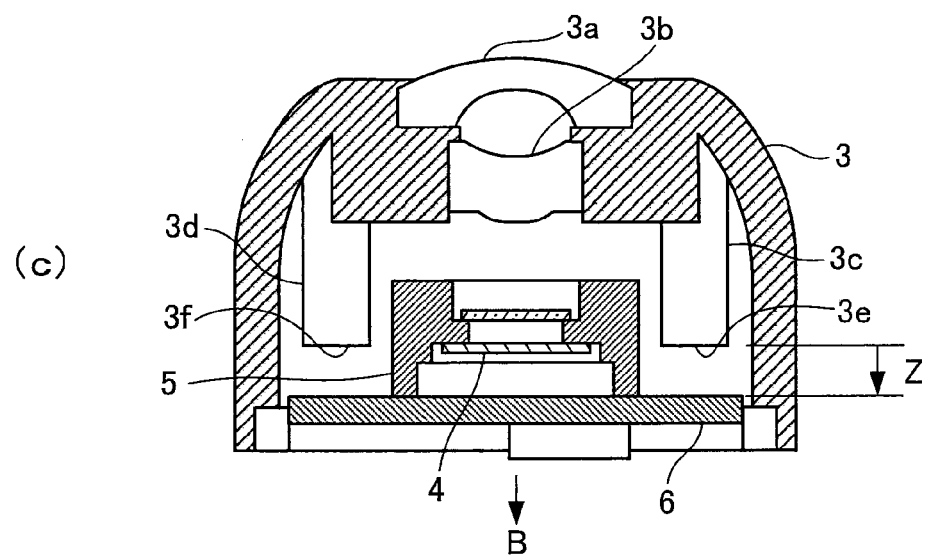
Figure 3:
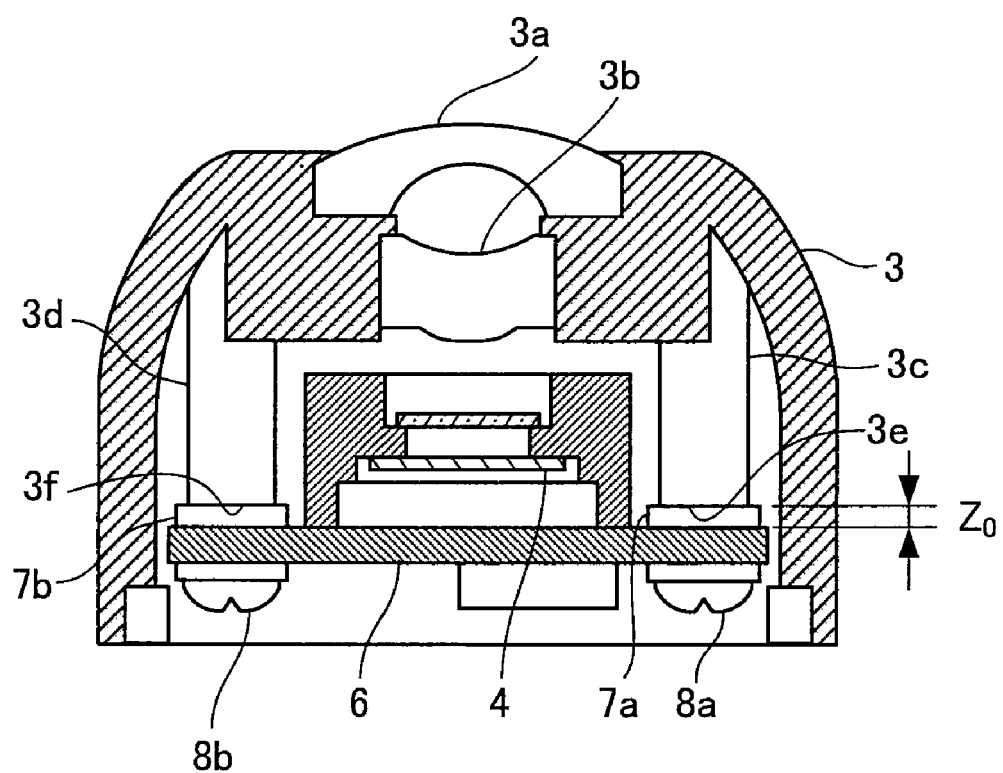
FIG. 3 is a cross-sectional view of the vehicle-mounted camera in accordance with the embodiment shown with spacers inserted.
Figure 4:
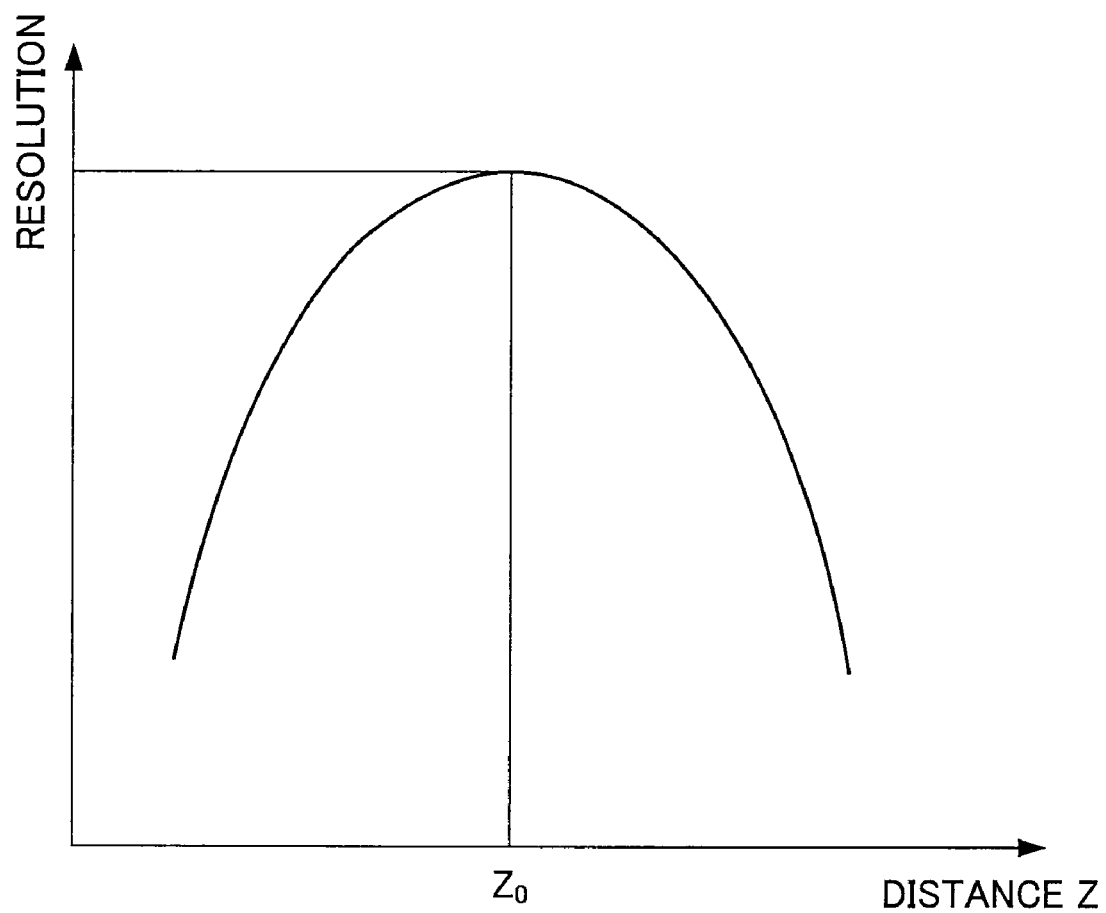
FIG. 4 is a chart indicating resolution characteristics in detecting a focus position of the vehicle-mounted camera in accordance with the embodiment.
Figure 5:
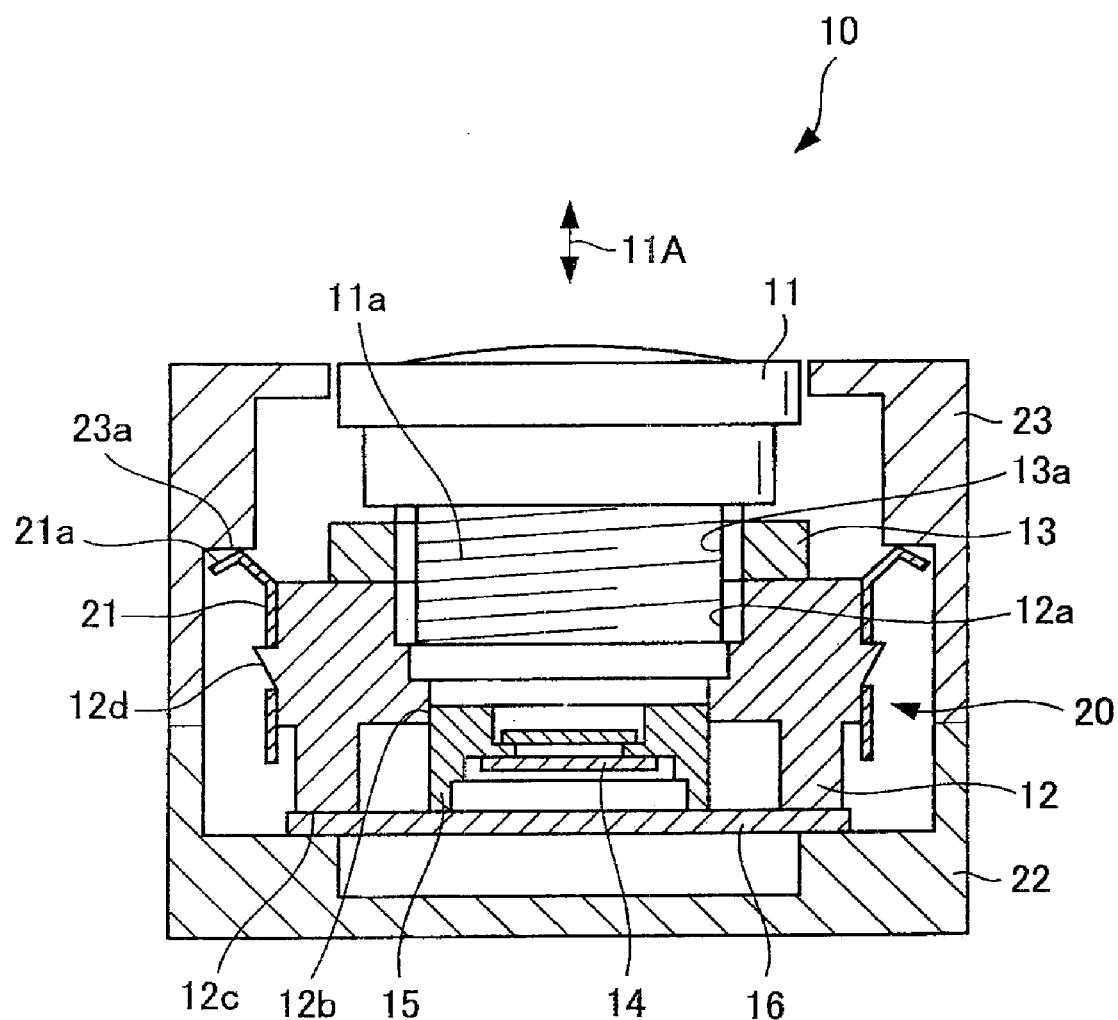
FIG. 5 is a cross-sectional view of an imaging device in related art.

More specifically, as shown in FIG. 2B, under the condition where the MID mounting substrate 6 is abutted to the substrate mounting bosses 3c and 3d, the imaging element 4 photographs the focus adjustment chart. While the imaging element 4 is photographing the focus adjustment chart, with the end faces 3e and 3f of the substrate mounting bosses 3c and 3d as a reference plane where the mounting faces 6a and 6b of the MID mounting substrate 6 abut, the resolution is measured by varying a distance Z between the end faces 3e and 3f of the substrate mounting bosses 3c and 3d and the mounting surfaces of the MID mounting substrate 6 on substrate mounting bosses side, hereinafter referred to as "upper surface of the MID mounting substrate 6", in the direction of an arrow B. That is to say, the resolution is measured by moving the MID mounting substrate 6 in the direction of optical axis of the lenses 3a and 3b. In this case, the relationship of the resolution of the focus adjustment chart photographed by the imaging element 4 with respect to the distance Z becomes as shown in FIG. 4. It shows that, when the distance Z is not appropriate, the resolution of the focus adjustment chart photographed by the imaging element 4 becomes lower.

Consequently, as shown in FIG. 4, when the distance between the end faces 3e and 3f of the substrate mounting bosses 3c and 3d and the upper surface of the MID mounting substrate 6 is set to a distance Zo of which the resolution of the focus adjustment chart photographed by the imaging element 4 becomes the highest, the optimal focus position of the imaging element 4 with respect to the lenses 3a and 3b can be obtained.

Next, assembling process of the vehicle-mounted camera 1 will be described.

FIGS. 2A to 2C are cross-sectional views of the vehicle-mounted camera 1 illustrating a part of its assembling process.

First, as shown in FIG. 2A, the upper case 3 with the lenses 3a and 3b embedded is prepared in advance.

Then, as shown in FIG. 2B, the MID mounting substrate 6 having the MID 5 provided with the imaging element 4 mounted in advance is abutted to the end faces 3e and 3f of the substrate mounting bosses 3c and 3d formed in the upper case 3. In this case, the MID 5 mounted on the MID mounting substrate 6 is inserted, as described in the foregoing, between the two substrate mounting bosses 3c and 3d formed in the upper case 3.

Next, the following work is carried out as focus adjustment.

First, the above-mentioned detection of focus position is carried out to obtain the distance Zo.

Then, the spacers 7a and 7b that are set to a thickness corresponding to the distance Zo are inserted as the adjustment members between the end faces 3e and 3f of the substrate mounting bosses 3c and 3d and the upper surface of the MID mounting substrate 6.

With the spacers 7a and 7b being inserted between the end faces 3e and 3f of the substrate mounting bosses 3c and 3d and the upper surface of the MID mounting substrate 6, the MID mounting substrate 6 is secured to the substrate mounting bosses 3c and 3d with the fixing screws 8a and 8b as securing means. This fixes the imaging element 4 to an appropriate focus position and completes the focus adjustment.

Further, in this case, by securing the MID mounting substrate 6 to the substrate mounting bosses 3c and 3d with the fixing screws 8a and 8b, the MID mounting substrate 6 is also appropriately positioned in the direction orthogonal to the optical axis of the lenses 3a and 3b.

In the focus adjustment above, the above-described distance Zo of the optimal focus point differs from one vehicle-mounted camera to another because of the variances in position of the lenses, height of the MID, or the like. Accordingly, in the above focus adjustment, it is preferable that, with a plurality of spacers having different thicknesses in steps prepared in advance, the spacers of a thickness corresponding to the distance Zo be selected out of the plurality of spacers for each of the vehicle-mounted cameras.

The spacers used in the above focus adjustment are not necessarily required to correspond precisely to the above-described distance Zo. The spacers may be selected from the spacers corresponding to a range of distance where the displacement of focus is in a tolerable degree that is, for example, allowable by depth of focus.

Finally, the lower case 2 and the upper case 3 are bonded together by ultrasonic welding so as to make the case body of the vehicle-mounted camera 1 unified.

As described in the foregoing, in the vehicle-mounted camera 1 according to the embodiment of the present invention, since the substrate mounting bosses 3c and 3d are integrally formed with the upper case 3 which is unified with the lenses 3a and 3b, and the MID mounting substrate 6 is secured to these substrate mounting bosses 3c and 3d, the imaging element 4 can be prevented from being displaced not only with respect to the lenses 3a and 3b, but also with respect to the case body of the vehicle-mounted camera 1.

As a consequence, in the vehicle-mounted camera 1 according to the present embodiment, the optical axis of the lenses is prevented from being displaced by vibrations or the like, thereby maintaining the imaging area in a default setting even when the vibrations or the like are exerted.

Further, in the vehicle-mounted camera 1 according to the present embodiment, since the MID mounting substrate 6 is secured, via the spacers 7a and 7b, to the substrate mounting bosses 3c and 3d integrally formed with the upper case 3 which is provided with the lenses 3a and 3b, the manufacturing process of the vehicle-mounted camera 1 can be simplified, thereby facilitating the production of the vehicle-mounted camera 1.

Furthermore, in the vehicle-mounted camera 1 according to the present embodiment, since the MID mounting substrate 6 is secured to the substrate mounting bosses 3c and 3d with the spacers 7a and 7b, the thicknesses of which correspond to the distance Zo of which the optimal focus position is obtainable, being inserted (i.e., interposed) between the end faces 3e and 3f of the substrate mounting bosses 3c and 3d and the upper surface of the MID mounting substrate 6, the focus adjustment process can be simplified.

In the present embodiment, the lenses 3a and 3b are exemplified to be embedded in the upper case 3. The present invention is not limited to such a structure and, for example, it may be structured to mount a separate lens barrel provided with a group of lenses to the upper case 3 in a unified manner.

Further, in the present embodiment, while the circuit board that is mounted with the imaging element formed in MID method is exemplified, the present invention is not limited as such. The present invention may also be applied, for example, to a circuit board that is mounted with a packaged imaging element.

INDUSTRIAL APPLICABILITY

As described in the foregoing, the imaging device and the manufacturing method thereof according to the present invention has advantages of simplifying the manufacturing process thereof facilitating its production, and preventing the optical axis of the lenses from being displaced due to vibrations or the like. The present invention is useful for an imaging device installed in a vehicle for taking an image of an object and for a manufacturing method thereof.

What is claimed is:

1. A method for manufacturing an imaging device, comprising a second case holding a lens group composed of a plurality of lenses and constituting a body case integrally with a first case, an imaging element for converting an image obtained through said lens group into an electrical signal, and a circuit board with said imaging element mounted thereon, said second case having mounting means for fixing said circuit board thereto, comprising:

adjusting a clearance between said mounting means and said circuit board by moving said circuit board in a direction of an optical axis of said lens group to a position where said imaging element obtains an optimal image to measure said clearance;

interposing an adjustment member having a thickness based on said clearance measured at said position between said circuit board and said mounting means; and fixing said circuit board onto said mounting means.

2. A method for manufacturing an imaging device as set forth in claim 1, further comprising selecting said adjustment member based on said measuring from a plurality of adjustment members having different thicknesses prepared in advance.

* * * * *